Aug. 14, 1928. 1,680,886
L. JANOIR
DEVICE FOR MOUNTING GLASSES ON THE DOORS OF VEHICLES
Filed Nov. 22, 1926 2 Sheets-Sheet 1
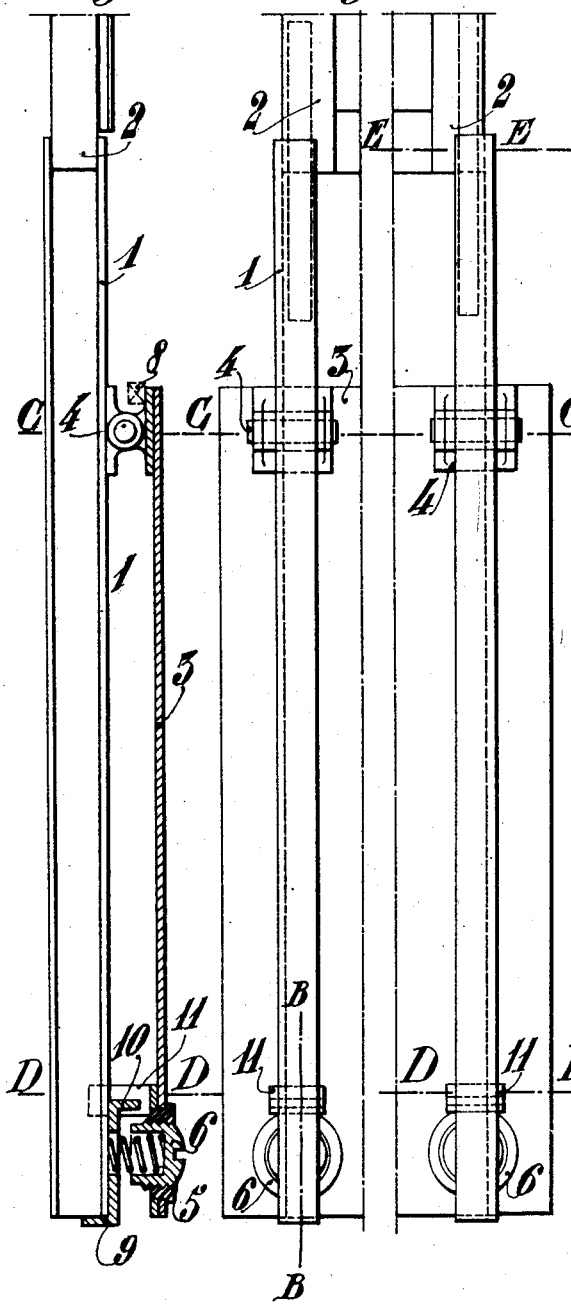
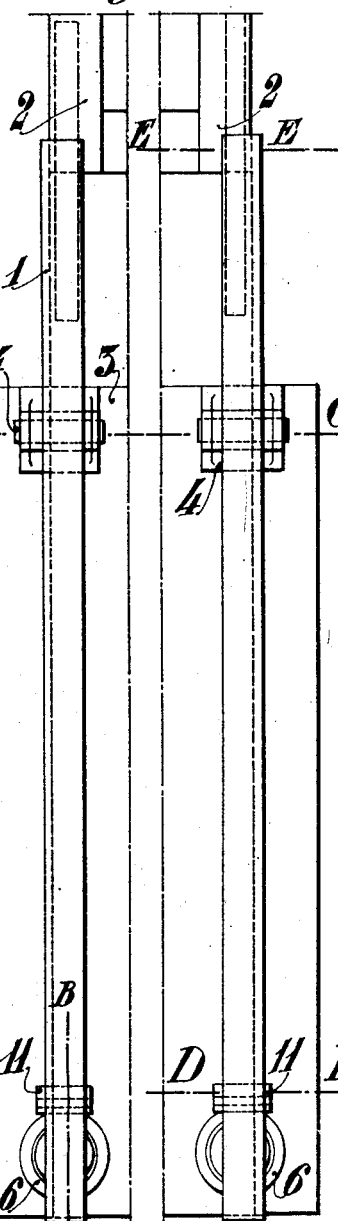
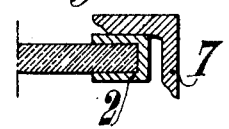
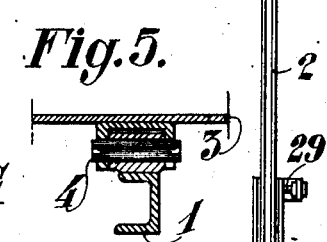
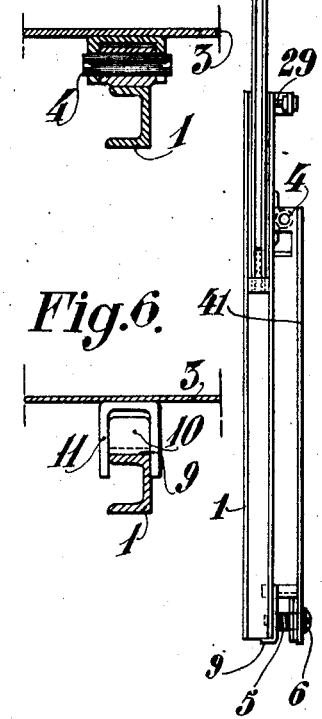
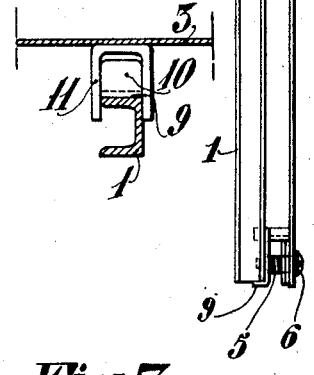
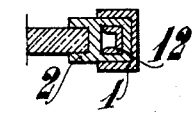
L. Janoir
inventor
By: Marks & Clerk
Attys.

Aug. 14, 1928.
L. JANOIR
1,680,886
DEVICE FOR MOUNTING GLASSES ON THE DOORS OF VEHICLES
Filed Nov. 22, 1926     2 Sheets-Sheet 2
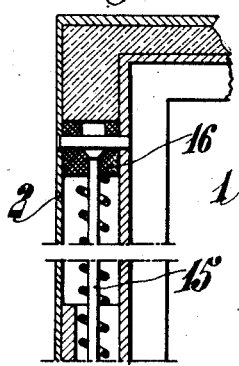
Fig. 8.
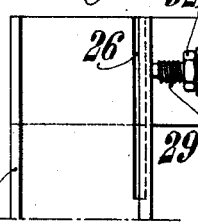
Fig. 10.
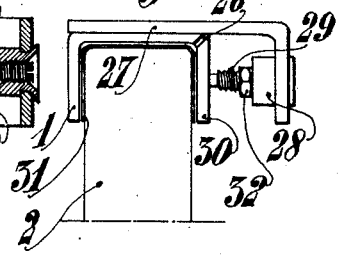
Fig. 11.
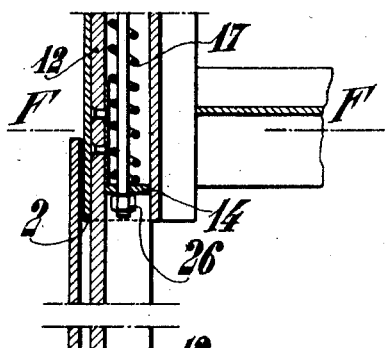
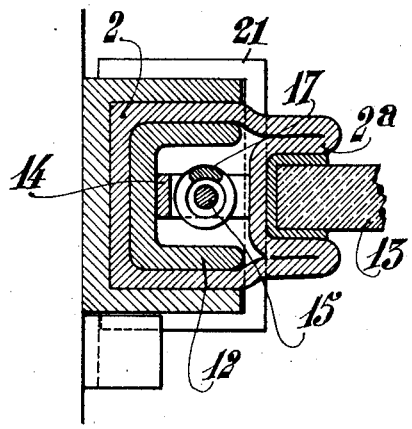
Fig. 9.
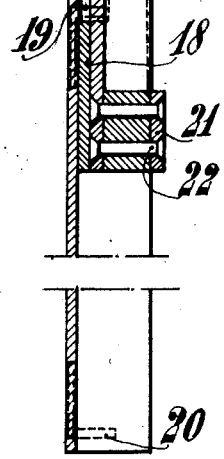
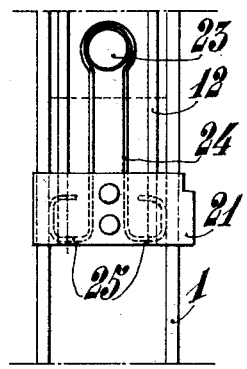
Fig. 12.
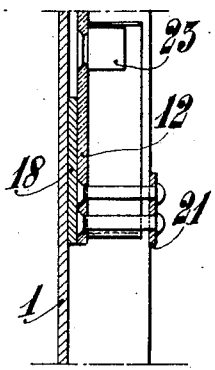
Fig. 13.
L. Janoir
inventor
By: Marks & Clerk
Attys.

Patented Aug. 14, 1928.

1,680,886

UNITED STATES PATENT OFFICE.

LOUIS JANOIR, OF ST.-OUEN, FRANCE.

DEVICE FOR MOUNTING GLASSES ON THE DOORS OF VEHICLES.

Application filed November 22, 1926, Serial No. 150,079, and in France November 27, 1925.

The invention relates to carriage bodies for vehicles, and more particularly for motor vehicles. It concerns improvements in devices for mounting sliding glasses on vehicle doors.

One of the main objects of these improvements is to realize the simple mounting of the slides of the glass frame relatively to the door frame, so that the glass when it is raised is, notwithstanding the distortions of the door frame, constantly and resiliently pressed against the said frame in order to avoid all disagreeable noises.

Another object of the invention is to realize the mounting of the sliding glass frame in its slides such that the said frame and especially the outer faces of the vertical posts of the latter have the appearance of solid bars the faces of which do not present any notch or groove and are held without play in the slides. This method of mounting the glasses is also adapted to avoid shocks when the glass is lowered or raised to the limit of its displacement.

The accompanying drawing illustrates, by way of example only, a form of construction of a system for mounting a glass on a door frame, in accordance with this invention.

Fig. 1 is a transverse section of the mounting, showing the sash in a raised position.

Fig. 2 is a front view, on an enlarged scale, of the setting device showing the method of mounting the sash slides on the door frame.

Fig. 3 is a cross section taken on line B—B of Fig. 2.

Fig. 4 is a horizontal section showing the sash frame pressed against a guide.

Figs. 5 and 6 are horizontal sections taken on lines C—C and D—D, respectively of Figs. 2 and 3.

Fig. 7 is a section taken on line E—E of Fig. 2, showing the arrangement of one of the slide-blocks of the sash frame.

Fig. 8 is a view, on an enlarged scale, in longitudinal section, through the guide device of the sash frame, when the latter is in its raised position.

Fig. 9 is a horizontal section, on an enlarged scale, taken on line F—F of Fig. 8.

Fig. 10 shows on an enlarged scale in elevation and partial section the upper part of a slide of a sash frame, provided with a device for taking up play.

Fig. 11 is a corresponding plan view.

Figs. 12 and 13 show in side view and axial section, respectively the lower part of a slide-block of a sash frame, and its guide device in the door slide.

The slides 1 in which is guided the sash frame are not rigidly secured on the door frame 3; they are mounted on the door, near their upper end, by a joint 4; at its other end, each slide 1 is subjected to the action of a coil spring 5 mounted in a cup-shaped member 6 secured to the door, this spring tending to push back the lower part of the slide 1 outwardly, that is to say to bring back its upper part towards the interior of the car, by causing the slide to pivot about its pivotal axis 4 on the door 3.

The slides 1, by thus pivoting, move the sash frame 2 by constantly pressing it against guides 7 (Fig. 4) rigid with the carriage body at its upper part. These guides can be completely concealed; in this case the slides 1 take a bearing against abutments 8 (Fig. 3) rigid with the door frame and arranged immediately above the joints 4.

Owing to this arrangement, the sash frame can no longer produce any clacking noises by striking against its guides.

For preventing the slides 1 from playing in a lateral direction on the door 3 which serves as a support for the same, on the lower part of each slide is secured a sliding member 9 the horizontal flange 10 of which is fitted between the vertical side flanges of a U-shaped member 11 (Figs. 3 and 6) secured to the door 3; this flange 10 of the member 9 can move, during the pivotal movement of the slide 1, between the flanges of the member 11, while being held by the said latter flanges in the lateral direction.

As illustrated more particularly in Fig. 7, the slide-blocks 12 of the glass frame are arranged within the frame 2 which for that purpose is made hollow, as hereinafter explained.

The fitting up of the sash in the slides 1, is illustrated in Figs. 8 to 13.

Each of the sides or posts 2 of the sash frame is constituted by a special profiled member (see particularly Fig. 9) having a closed cross section, with inner extensions $2^a$ limiting a housing for the glass 13; the member constitutes a housing containing the slide-block 12 presenting a U shaped cross section and this member 2 being able to slide along the said slide-block 12.

Each slide-block carries, at about the middle of its height, an angle member 14 the horizontal branch of which is perforated with an opening for permitting the passage, and guiding of a link 15 also arranged within the post 2 and rendered rigid, at its upper end, with the said post 2 by a liner 16.

In the space comprised between the liner 16 and the guide angle member 14 there is arranged, about the link 15, a coil spring 17. Both springs 17 resiliently support the weight of the sash frame on the slide-blocks 12 through the medium of the angle members 14.

The lower half of each slide-block 12 is fitted in the slide 1 secured on the door frame. A lining 18 is secured to the lower end of the slide-block 12, so as to fit with a slight friction in the slide 1. Abutments 19 and 20 provided on the slides 1 respectively determine the maximum points of lifting and lowering of the slide-blocks 12 within the slides. For that purpose, a U-shaped stop member 21, secured to the slide-block 12 by rivets 22 (Fig. 8), surrounds the slide 1, so as to encounter the member 20 acting as an abutment and outwardly projecting on the slide (Fig. 9).

The method of mounting illustrated in Figs. 12 and 13 may also be adopted. In these figures the same reference letters designate the same parts (or corresponding parts) as in Figs. 10 and 9.

In the example of Figs. 12 and 13, the slide-block 12 carries a stud 23 with which engages a resilient clip 24, the ends of which, in the shape of friction shoes 25, bear on the flanges of the slide and hold the slide-block 12, relatively to the former, in a resilient manner. The parts 18 and 21 complete the guiding device, the part 21 acting as an abutment in the same manner as explained with reference to Figs. 8 and 9.

When the sash frame 2 is lowered, the coil springs 17 are compressed; these springs by resiliently supporting the sash frame 2 on the guide, single members 14, deaden the shock and reduce the noise caused by the slide-blocks 12 when they fall back on their abutments 20 when the sash is lowered.

When the sash is raised, the springs by relaxing facilitate the rising movement. The links 15 move upwardly at the same time as the frame 2 until a nut 26, screwed on their lower end, abuts against the angle member 14. From this moment, the slide-blocks 12 are moved with the frame 2 until they are stopped at their lower part by the abutments 19. In this position, they are inserted to about one half of their height in the slides 1, as illustrated in Fig. 6 and inserted on the same distance in the posts 2. They take a bearing at their lower part on the slides 1, as explained above, so that the whole is sufficiently held to avoid the noises caused by transverse beating of the sash.

It will be seen that with this arrangement the slide-blocks are entirely concealed in the sash frame, the external appearance of which is aesthetic owing to the absence of any cavity, notch or groove.

For taking up the play, which, after use, may take place between the glass posts 2 and the upper part of the slides 1, use is made of the arrangement illustrated in Figs. 11 and 12. A saw cut is formed at 26 so as to separate from the slide 1 a portion of one of the flanges of the latter for rendering it distortable. An angle member 27 is secured, by rivets or otherwise, on the web of the slide 1 and is provided with an internally screw threaded part 28 in which is screwed a screw 29 which bears on the distortable portion 30. By tightening the screw 29 to a greater or less extent, it is possible to take up the play occurring between the sash frame 2 and the slide 1. Friction strips 31, made of fibre or the like, may be provided for facilitating the sliding movement of the sash frame 2. The screw 29 may be braked or immobilized in the suitable position by a nut 32.

What I claim as my invention and desire to secure by Letters Patent is:

1. In combination with a vehicle door, a device for mounting a sliding sash, comprising side slides for the sash, a joint device connecting each slide, near its upper part, with the door frame, resilient means interposed between the lower part of each slide and the said door frame so as to move the sash, when it is raised inwardly against the carriage body, abutments on the said door frame for limiting the inward movement of the sash when the door is opened, and means transversely holding the slides at their lower part.

2. In combination with a vehicle door, a device for mounting a sliding sash, comprising side slides for the sash, a joint device connecting each slide, near its upper part, with the door frame, a sole member secured at the lower part of each slide, a spring interposed between the said sole member and a cup or screw adjustable on the door frame, abutments on the said frame for limiting the inward movement of the slides exerted by the said springs when the door is opened, and means transversely holding the slides at their lower part.

3. In combination with a vehicle door, a device for mounting a sliding sash, comprising side slides for the sash, a joint device connecting each slide, near its upper part, with the door frame, a sole member secured at the lower part of each slide, a spring interposed between the said sole member and a cup or screw adjustable on the door frame, abutments on the said frame for limiting the inward movement of the slides exerted by the said springs, when the door is opened, and an extension or nose of the sole member supporting the spring, fitted between the vertical flanges of a U-shaped member secured on the door frame, transversely holding each slide at its lower part.

4. In combination with a vehicle door, a device for mounting a sliding sash, comprising side slides for the sash, the cross section of which is of U shape, side posts of the sash, in the shape of hollow bars fitting in the said slides, a slide-block the cross section of which is of U shape and slidably fitting within the said posts, means for resiliently connecting the said slide-block and the corresponding sash posts, means for guiding the said slide-block at its lower part in the door slide, abutments for limiting the extreme high and low positions of the said slide-block relatively to the said slide, and means for taking up the play of the frame post in the slide, at the upper part of the latter.

5. In combination with a vehicle door, a device for mounting a sliding sash, comprising side slides for the sash, the cross section of which is of U shape, side posts of the sash in the shape of hollow bars fitting in the said slides, a slide-block the cross section of which is of U shape and slidably fitting within the said posts, a sole member secured on the said slide-block, a block internally secured to the sash post, a compression spring interposed between the said sole member and the said block, a rod secured on the latter and passing through the said sole member on which bears a nut screwed on the said rod and forming an abutment for limiting the inward development of the frame post relatively to the slide-block, a resilient clip secured to the lower part of the latter and bearing, through its ends in the shape of brake shoes, on the door slide for resiliently guiding the slide-block relatively to the latter, a lug secured to the upper part of the said slide, a pressure screw fitted in a bearing portion of the said lug for bearing on a distortable flange of the said slide and taking up the play of the sash post in the latter.

6. In combination with a vehicle door, a device for mounting a sliding sash, comprising side slides for the sash, a joint device connecting each slide, near its upper part, with the door frame, a sole member secured at the lower part of each slide, a spring interposed between the said sole member and a cup or screw adjustable on the door frame, abutments on the said frame for limiting the inward movement of the slides exerted by the said springs, when the door is opened, and an extension or nose of the sole member supporting the spring, fitted between the vertical flanges of a U-shaped member secured on the door frame, and transversely holding each slide at its lower part, side posts of the sash, in the shape of hollow bars fitting in the said slides, a slide-block the cross section of which is of U shape and slidably fitting within the said posts, a sole member secured on the said slide-block, a block internally secured to the sash post, a compression spring interposed between the said sole member and the said block, a rod secured on the latter and passing through the said sole member on which bears a nut screwed on the said rod and forming an abutment for limiting the inward development of the frame post relatively to the slide-block, a resilient clip secured to the lower part of the latter and bearing, through its ends in the shape of brake shoes, on the door slide for resiliently guiding the slide-block relatively to the latter, a lug secured to the upper part of the said slide, a pressure screw fitted in a bearing portion of the said lug for bearing on a distortable flange of the said slide and taking up the play of the sash post in the latter.

In testimony whereof I have signed my name to this specification.

LOUIS JANOIR.